(# 3,082,183
GLASS FIBER SIZE COMPRISING AN AQUEOUS DISPERSION OF A FILM FORMING POLYMER, A COUPLING AGENT AND POLYVINYL PYRROLIDONE

Alton R. Boyd, Nashville, Tenn., assignor to Ferro Corporation, Cleveland, Ohio, a corporation of Ohio
No Drawing. Filed Jan. 30, 1959, Ser. No. 790,043
11 Claims. (Cl. 260—29.6)

This invention relates to a size composition for glass fibers and more particularly to a permanent size composition for glass fibers which may be used in the manufacturing of glass cloth.

A principal objective of this invention is to produce a size composition which when applied to glass fibers enables the glass fibers to be twisted, plied and woven efficiently and is also compatible with laminating resins. This eliminates the de-sizing and refinishing process that is necessary when an oil-starch size is used.

This latter type of size material commonly used throughout the glass cloth industry enables the fibers to be twisted, plied and woven into cloth. It must, however, be removed by washing or heat cleaning and a finish applied to the cloth before the cloth is suitable for use in reinforcing plastics, e.g., polyesters. Other size compositions have been developed that enable twisting, plying and weaving of glass fibers which do not have to be removed prior to lamination. Cloth made from fibers treated with these latter size compositions do not "wet-out" rapidly or completely in the resin and thus do not give glass fiber reinforced plastic objects as of high physical strength as is produced with de-sized and refinished cloth.

A size formulation has thus been discovered that will produce cloth that "wets-out" rapidly and comparably to desized and refinished glass fiber cloth. Cloth made from fibers coated with the size formulations of the present invention gives reinforced plastic objects of strengths equal to, and in some cases better than, de-sized and refinished cloth.

The compositions of the present invention are based primarily upon the discovery that polyvinyl pyrrolidone in combination with the other components of this invention will produce a glass fiber size composition that yields the above described desirable characteristics.

Other objects of the invention will appear as the description proceeds.

Broadly stated, therefore, the present invention is in the provision of a glass fiber size composition comprising an aqueous dispersion of from about 1% to about 7% by weight of a plasticized polymeric film-forming material consisting of non-hydrocarbon monomer units, from about 0.8% to about 3.5% by weight of a coupling agent, from about 0.2% to about 1% by weight of polyvinyl pyrrolidone, and from about 75% to about 98% water.

From the foregoing it will be observed that in general the compositions of this invention are composed of an aqueous dispersion of a film-forming material, a plasticizer therefore of either the external or internal type, a "coupling agent," and polyvinyl pyrrolidone. Other ingredients may be included in the compositions of this invention such as coloring matter, lubricants, additional plasticizers, etc.

Referring now more particularly to the film-forming material, the principal objective in selecting the film-forming material, is that it shall be compatible with the laminating resin. Included among the resinous materials which may thus be employed as the film-forming material are polyvinyl acetate, copolymers of vinyl acetate and vinyl stearate, copolymers of vinyl acetate and vinyl pyrrolidone, copolymers of vinyl acetate and vinyl halides, e.g., vinyl chloride, polymethylmethacrylate, polybutyl methacrylate, copolymers of acrylic and methacrylic alkyl esters, terpolymers of various acrylic esters with styrene or acrylonitrile, phenol-aldehyde condensation products, amino-triazine-aldehyde condensation products, etc. The art is replete with examples of resinous materials falling within the aforementioned classes, specific attention being directed to Fikentscher 1,933,052 for acrylic-styrene copolymers and acrylic nitrile/acrylic ethyl ester/styrene terpolymers, Slocombe 2,757,165 for vinyl acetate/acrylonitrile/styrene terpolymers, Conn et al. 2,795,564 for emulsion terpolymers of alkyl acrylates/alkyl alkacrylates and/alkacrylic acid, Mark 2,068,424 for polyvinyl halide emulsions, Voss 2,109,981 for polyvinyl acetate emulsions, Collins et al. 2,444,396 for polyvinyl acetate emulsions, Talbot 2,260,239 for melamine aldehyde condensation products, etc. These film-forming compositions are generally characterized in that they are nonhydrocarbon polymers, copolymers and terpolymers. Where a plurality of monomers are used, one of the monomers may be hydrocarbon, e.g., styrene or vinyl toluene. Entirely hydrocarbon polymers and copolymers, e.g., butadiene-styrene, polyethylene and polypropylene are not suitable for the purposes of this invention and hence polymers predominantly non-hydrocarbon and characterized by the presence therein of polar functional groups, for example, ester groups, hydroxyl groups, halide groups, amino groups, amide groups, nitrile groups, carboxylic acid groups, or any combination of these characterize the film-forming resins of the present invention.

The film-forming component of the present compositions may be initially homopolymerized, copolymerized, terpolymerized or monomer modified in an emulsion system, or the homopolymer, copolymer, terpolymer or modification may be effected in solution, and the resinuous material post emulsified by techniques commonly known to those skilled in the art.

The film-forming ingredient is present in the aqueous dispersion in the present composition in amounts ranging from about 1% to about 7% by weight.

As indicated above, the film-forming compositions of the present invention desirably, though not essentially, contain a plasticizer. The plasticizer may be of the external or internal type. Common examples of plasticizers which may be utilized for combination with the film-forming ingredients above mentioned include diallyl phthalate, dibutyl phthalate, dioctyl phthalate, tricresyl phosphate, vinyl stearate. The foregoing are normally regarded as external plasticizers. Internal plasticization may be achieved by copolymerizing with the film-forming material a suitable internal plasticizer such as, for example, vinyl stearate. A homopolymer of vinyl acetate produced from the monomer containing about 5% by weight of vinyl stearate yields a predominantly homopolymer of vinyl acetate having dispersed therein copolymer units made up of vinyl acetate and vinyl stearate which exert plasticizing effect upon the homopolymer. Numerous plasticizers for the particular resins above mentioned are well known to those skilled in the art and any of such plasticizers may be used if desired.

The plasticizer component of the compositions of the present invention when used, may be used in amounts up to about 6% by weight.

The next essential ingredient of the compositions of the present invention comprises a "coupling agent." Coupling agents are well known to those skilled in the art of preparing size compositions for glass fibers. Securing adhesion to glass fiber is a problem and requires the presence in the composition of a material which is capable through electro co-valency of chelating with the glass surface to form a strong bond therewith. A principal class of coupling agents for this purpose include the organic silanes which are characterized in their ability to hydrolyze. The nature of the organic radical here is not of critical importance except the greater the degree of compatibility with the resinous material, the greater the coupling power between the resinous material and the glass surface. Particularly effective silane materials include phenyl trichlorosilane, p-tolyltrichlorosilane, allyltrichlorosilane, diallyldichlorosilane, methyl vinyl dichlorosilane, vinyl triethoxy methoxy silane etc.

Another class of coupling agents which may be used in accordance with this invention include the Werner type chromium complex materials, the preparation and a general description of which are included in the patent to Iler 2,273,040. Specific examples of such Werner type chromium complexes include stearato chromic chloride, acrylato chromic chloride, methacrylato chromic chloride, propionato chromic chloride, etc. Other acids which are useful in the formation of complex chromium compounds useful herein are formic acid, acetic acid, butyric acid, isobutyric acid, crotonic acid, methacrylic acid, ethacrylic acid, iso-crotonic acid, vinyl acetic acid, etc. These yield with basic chromic chloride, $Cr(OH)Cl_3.6H_2O$, the corresponding carboxylato chromic chloride complex. For more detailed instructions of preparation of these materials, reference may be had to the patent to Gobell et al., 2,544,666 dated March 13, 1951.

Mixtures of silane materials and Werner type chromium complex materials may also be used as the "coupling agent." For example, a coupling agent composed of equal parts by weight of vinyl silane triol and methacrylato chromic chloride may be used. In such mixtures the relative proportions of the types is not critical.

The coupling agent, whether a single compound or mixture of two or more, is essential in the compositions of this invention and is present in amounts ranging from 0.8–3.5%.

Lubricants of the type normally employed in the treatment of glass fibers may also be incorporated in these compositions, if desired, in amounts ranging up to about 1% by weight of the composition.

The next essential ingredient of the compositions of the present invention is polyvinyl pyrrolidone. This material has the structural formula as follows:

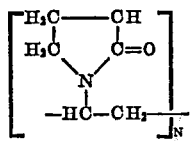

Polyvinyl pyrrolidone was developed in Germany as a substitute for blood plasma and in recent years has found wide use in hair sprays and cosmetics. It is a water-soluble polymer and is commercially available as white powders ranging in molecular weight from about 40,000 to about 400,000. These materials may also be supplied as aqueous solutions, a particularly useful material being a 20% aqueous solution having an average molecular weight of 360,000. The inclusion of polyvinyl pyrrolidone in the size compositions of the present invention produces sized glass fibers which "wet-out" rapidly and which avoids the necessity for de-sizing the fibers and refinishing prior to admixing with a laminating resin such as, for example, a polyester laminating resin. This ingredient is present in amounts ranging from about .2% to about 1% by weight of the entire composition, and it may replace in part or entirely the film-forming resin in amounts ranging from about 1 to about 7% as above described. Polyvinyl pyrrolidone, in the higher molecular weights particularly, has film-forming characteristics and sufficient polarity for excellent adhesion of the size fibers to the laminating resin to give a sufficiently strong final product.

A typical procedure for formulating a size composition in accordance with the present invention is as follows:

Example 1

13.5 lbs. of polyvinyl acetate (57% aqueous emulsion) are placed in a 7 gallon container. 12 lbs. of polyvinyl pyrrolidone (20% aqueous solution—360,000 M.W. ave.) are then added to the polyvinyl acetate. Approximately 1 gallon of water is added and the mixture stirred until homogeneous. With rapid agitation, 4.5 lbs. of dibutyl phthalate are added slowly. It is recommended, but not imperative, that the plasticized emulsion be allowed to stand for 24 hours to insure adequate plasticizing of the polyvinyl acetate. No separate emulsifying agent has been found necessary since there is sufficient emulsifying agent present in the polyvinyl acetate emulsion to insure adequate emulsification of the plasticizer. Into a 55 gallon container with stirrer attached and running, approximately 30 gallons of warm water are poured in, followed by the contents of the 7 gallon container as above described. 6.02 lbs. of a vinyl triethoxy methoxy silane (Union Carbide A–172) are slowly added. 0.67 lb. of an amide of pellargonic acid and tetraethylene pentamine solubilized with acetic acid and produced in accordance with British Pat. 767,726 is added to ½ gallon of water and stirred until dissolved. This solution is then poured into the 55 gallon container. 30 cc. of 90% formic acid are then added and the mixture diluted to a volume of 40 gallons. The pH of the formulation should be within the range of about 4.5 to 7 and if necessary may be adjusted with either ammonium hydroxide or more formic acid.

Example 2

Following the same procedure as set forth in Example 1 above, a size composition having the following ingredients in the proportions indicated was prepared:

| | Percent |
|---|---|
| Polyvinyl acetate (in form of 57% aqueous emulsion) | 2.34 |
| Dioctyl phthalate | 1.4 |
| Phenyl trichlorosilane | 1.8 |
| Polyvinyl Pyrrolidone (as 20% aqueous solution—360,000 M.W., ave.) | .72 |
| Water | 93.74 |

Example 3

The procedure of Example 2 above is repeated in all respects except that in place of the polyvinyl acetate emulsion there is employed a like amount of an emulsion of ammonium methacrylate/methylmethacrylate/ethylacrylate/-1:9:18.5 (29% solids).

Example 4

Following the same procedure as given in Example 2 above, butylated melamine formaldehyde resin emulsion (30% solids) was used as a replacement for the polyvinyl acetate to give a size compositon useful in accordance herewith.

Example 5

The composition of Example 2 substituting for the silane, a like amount of methacrylato chromic chloride as a coupling agent.

The foregoing are merely illustrative examples of the manner of compounding and formulating useful compositions in accordance with the present invention. Numerous other examples will become readily apparent to those skilled in the art.

These compositions are applied to glass fibers in the usual manner customary in the art. The reinforcing fibers which may be treated with the size compositions of the present invention may be in any of a number of fabricated forms.

The fibers may be collected into short lengths, strands or yarns that are loosely associated together in masses or in the form of webs or mats. Yarns or strands of glass fiber may be interwoven to form fabrics. Application of the size compositions may be accomplished by spraying, dipping or padding the fibrous material after application of these compositions is then dried either by exposing it to air for the necessary period of time or by heating to temperatures of about 200 to 250° F. periods ranging from minutes up to several hours. Strands may be made up of 204 filaments and have been collected in the form of continuous strands. As the fibers are formed they may be wound about a paper tube as one continuous strand. Each tube contains aproximately 30,000 yards of strand. The strand is normally dried while still on a paper tube. Paper tubes so wound are dried at 240° F. for eight (8) hours.

Glass fiber in its various shapes and forms sized with the compositions of the present invention demonstrates very much improved "wet-out," and it has been found unnecessary to remove the sizing composition prior to application of the laminating resin. Thus the steps of desizing and refinishing are eliminated by the compositions of the present invention.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. A glass fiber size composition comprising (1) about 1 to 7% by weight of an aqueous dispersion of a film forming material of the group consisting of polyvinyl acetate, copolymers of vinyl acetate and another copolymerizable vinyl monomer, polymethyl methacrylate, copolymers of methyl methacrylate and an alkyl acrylate, copolymers of alkyl acrylate with a copolymerizable vinyl monomer, a condensation product of phenol and an aldehyde, a condensation product of melamine and an aldehyde, a butylated melamine-formaldehyde condensation product, and a condensation product of aminotriazine and an aldehyde, (2) about 0.8 to 3.5% by weight of a coupling agent for adhering said film forming material to glass fibers, (3) about 2/10 to 1% by weight of polyvinyl pyrrolidone, and (4) about 75 to 98% by weight of water.

2. A glass fiber size composition comprising (1) about 1 to 7% by weight of an aqueous dispersion of a copolymer of ammonium methacrylate, methyl methacrylate and ethylacrylate, (2) about 0.8 to 3.5% by weight of a coupling agent for adhering said copolymer to glass fibers, (3) about 2/10 to 1% by weight of polyvinyl pyrrolidone, and (4) about 75 to 98% by weight of water.

3. A glass fiber size composition comprising (1) about 1 to 7% by weight of an aqueous dispersion of polyvinyl acetate, (2) about 0.8 to 3.5% by weight of a coupling agent for adhering said polyvinyl acetate to glass fibers, (3) about 2/10 to 1% by weight of polyvinyl pyrrolidone, and (4) about 75 to 98% by weight of water.

4. A composition as defined in claim 1 in which the film forming material is a copolymer of vinyl acetate and vinyl stearate.

5. A glass fiber size composition comprising (1) about 1 to 7% by weight of an aqueous dispersion of polyvinyl acetate, (2) about 8/10 to 3.5% by weight of a coupling agent comprising a Werner chromium complex for adhering the polyvinyl acetate to glass fibers, (3) about 2/10 to 1% by weight of polyvinyl pyrrolidone, and (4) the balance of the composition being water.

6. A composition as defined in claim 1 in which the coupling agent is a Werner chromium complex.

7. A composition as defined in claim 1 in which the coupling agent comprises a mixture of an organic silane and a Werner chromium complex.

8. A glass fiber size composition comprising an aqueous dispersion of from about 1% to about 7% of polyvinyl acetate, from about 0.5% to about 6% of a dialkyl phthalate plasticizer, from about 0.8% to about 3.5% of a phenyl trichlorosilane, and from about 0.2% to about 1% by weight of polyvinyl pyrrolidone, and from 75% to 98% water.

9. A glass fiber size compositon comprising (1) about 1 to 7 percent by weight of an aqueous dispersion of polyvinyl acetate, (2) about ½ to 6 percent by weight of a plasticizer for said polyvinyl acetate, (3) about 8/10 to 3½ percent by weight of a coupling agent for adhering said polyvinyl acetate to glass fibers, said coupling agent comprising a silane, (4) about 2/10 to 1 percent by weight of polyvinyl pyrrolidone, and (5) about 75 to 98 percent by weight of water.

10. A glass fiber size composition comprising (1) about 1 to 7 percent by weight of an aqueous dispersion of polyvinyl acetate, (2) about ½ to 6 percent by weight of a plasticizer for said polyvinyl acetate, (3) about 8/10 to 3½ percent by weight of a coupling agent for adhering said polyvinyl acetate to glass fibers, said coupling agent comprising a hydrocarbon substituted, halogen substituted silane, (4) about 2/10 to 1 percent by weight of polyvinyl pyrrolidone, and (5) about 75 to 98 percent by weight of water.

11. A glass fiber size composition comprising (1) about 1 to 7 percent by weight of an aqueous dispersion of polyvinyl acetate, (2) about ½ to 6 percent by weight of a plasticizer for said polyvinyl acetate, (3) about 8/10 to 3½ percent by weight of a coupling agent for adhering said polyvinyl acetate to glass fibers, said coupling agent comprising a mono aryl substituted, tri chlorine substituted silane, (4) about 2/10 to 1 percent by weight of polyvinyl pyrrolidone, and (5) about 75 to 98 percent by weight of water.

References Cited in the file of this patent

UNITED STATES PATENTS

| | | |
|---|---|---|
| 2,346,755 | Hemming | Apr. 18, 1944 |
| 2,390,370 | Hyde | Dec. 4, 1945 |
| 2,801,189 | Collier | July 30, 1957 |
| 2,809,953 | Werner et al. | Oct. 15, 1957 |
| 2,813,844 | Werner et al. | Nov. 19, 1957 |
| 2,853,465 | Werner | Sept. 23, 1958 |
| 2,938,812 | Marzocchi et al. | May 31, 1960 |
| 2,951,782 | Eilerman | Sept. 6, 1960 |
| 2,958,614 | Perry | Nov. 1, 1960 |
| 2,994,619 | Eilerman | Aug. 1, 1961 |